United States Patent
Pal et al.

(10) Patent No.: US 12,086,825 B2
(45) Date of Patent: Sep. 10, 2024

(54) SYSTEM AND METHOD FOR FINDING EFFECTIVENESS OF GAMIFICATION FOR IMPROVING PERFORMANCE OF A CONTACT CENTER

(71) Applicant: Nice Ltd., Ra'anana (IL)

(72) Inventors: Aniket Pal, Wakad Pune (IN); Manish Agrawal, Maharashtra (IN); Aniruddha Phadnis, Pune (IN)

(73) Assignee: Nice Ltd., Ra'anana (IL)

( * ) Notice: Subject to any disclaimer, the term of this patent is extended or adjusted under 35 U.S.C. 154(b) by 33 days.

(21) Appl. No.: 17/243,933

(22) Filed: Apr. 29, 2021

(65) Prior Publication Data
US 2022/0351229 A1     Nov. 3, 2022

(51) Int. Cl.
| | |
|---|---|
| G06Q 30/02 | (2023.01) |
| A63F 13/46 | (2014.01) |
| A63F 13/79 | (2014.01) |
| G06Q 30/0207 | (2023.01) |
| G06Q 30/0211 | (2023.01) |

(52) U.S. Cl.
CPC ......... *G06Q 30/0209* (2013.01); *A63F 13/46* (2014.09); *A63F 13/79* (2014.09); *G06Q 30/0211* (2013.01)

(58) Field of Classification Search
CPC .................................. G06Q 30/0207–30/0277
See application file for complete search history.

(56) References Cited

U.S. PATENT DOCUMENTS

| | | | |
|---|---|---|---|
| 8,538,006 B1* | 9/2013 | Noble, Jr. ............... | H04M 3/51 379/265.06 |
| 2014/0192970 A1* | 7/2014 | Castellani ........... | H04M 3/5175 379/265.06 |
| 2015/0030151 A1* | 1/2015 | Bellini ................. | G06Q 10/063 379/265.06 |
| 2015/0181038 A1* | 6/2015 | Fox ...................... | H04M 3/5175 379/265.06 |
| 2016/0086121 A1* | 3/2016 | Heilbrunn ........ | G06Q 10/06393 705/7.39 |
| 2016/0086125 A1* | 3/2016 | Hanrahan ........ | G06Q 10/06398 705/7.42 |
| 2016/0089608 A1* | 3/2016 | Deng .................... | G06Q 10/06 463/29 |

(Continued)

OTHER PUBLICATIONS

Context Aware Routing of Enterprise User Communications, De Choudhury et al., Proceedings of the Fifth Annual IEEE International Conference on Pervasive Computing and Communications Workshops(PerComW'07) 0-7695-2788-4/07 © 2007.*

(Continued)

*Primary Examiner* — David J Stoltenberg
(74) *Attorney, Agent, or Firm* — PEARL COHEN ZEDEK LATZER BARATZ LLP

(57) ABSTRACT

A computer based system and method for measuring effectiveness of a gamification challenge may include: presenting the gamification challenge on a display to an agent; measuring agent engagement with the gamification challenge over time to calculate agent engagement indices over time; measuring agent performance over time to calculate agent performance indices over time; and calculating a correlation between the agent engagement indices and the agent performance indices to obtain the gamification effectiveness.

18 Claims, 6 Drawing Sheets

(56) References Cited

U.S. PATENT DOCUMENTS

| | | | |
|---|---|---|---|
| 2016/0094411 A1* | 3/2016 | Brennan | H04L 41/5009 709/224 |
| 2016/0125344 A1* | 5/2016 | Carmeli | G06Q 10/06393 705/7.39 |
| 2016/0151704 A1* | 6/2016 | Wu | A63F 13/35 463/31 |
| 2016/0239780 A1* | 8/2016 | Liljenquist | G06Q 10/06393 |
| 2017/0193420 A1* | 7/2017 | Tiwari | G06Q 50/01 |
| 2018/0034966 A1* | 2/2018 | te Booij | H04M 3/5232 |
| 2018/0240140 A1* | 8/2018 | Whitley | G06Q 50/22 |
| 2018/0336588 A1* | 11/2018 | Kohareswaran | G06Q 30/0243 |
| 2020/0329142 A1* | 10/2020 | Pearce | G06Q 30/01 |
| 2021/0043099 A1* | 2/2021 | Du | G06N 3/006 |
| 2021/0044698 A1* | 2/2021 | Thalange | G06Q 10/063112 |
| 2021/0084156 A1* | 3/2021 | Paiva | H04M 3/5175 |
| 2021/0400141 A1* | 12/2021 | Feast | H04M 3/5233 |

OTHER PUBLICATIONS

Influence of the Contact Center Systems Development on Key Performance Indicators; Plaza et al., IEEE Access, date of publication Mar. 18, 2021, date of current version Mar. 26, 2021.*

Social Business Transformation through Gamification, Jitendra Maan, International Journal of Managing Information Technology (IJMIT) vol. 5, No. 3, Aug. 2013.*

Performance Evaluation of Call Center Agents by Neural Networks, Huang Hsu et al., 2016 30th International Conference on Advanced Information Networking and Applications Workshops.*

Usage of Gamification in Enterprise: A Review, Aziz et al., 2017 International Conference on Communication, Computing and Digital Systems (C-CODE).*

A Method to Engage Employees using Gamification in BPO Industry; Basanth Kumar Neeli; 2012 Third International Conference on Services in Emerging Markets.*

* cited by examiner

SYSTEM AND METHOD FOR FINDING EFFECTIVENESS OF GAMIFICATION FOR IMPROVING PERFORMANCE OF A CONTACT CENTER

FIELD OF THE INVENTION

The invention relates generally to technology for calculating effectiveness of gamification programs, for example, in contact centers.

BACKGROUND OF THE INVENTION

Gamification techniques may be used in contact centers in an attempt to improve the performance of agents. Gamification techniques may include creating challenges for agents and assigning multiple levels of goals within the challenge where each goal is associated with some reward or recognition. Typically, each subsequent goal within the challenge gets tougher for the agents to achieve and reward values also increase respectively.

The goals of the gamification challenges may be defined with relation to measurable key performance indicators (KPIs) used to measure the performance of the agents on their primary job. Examples for performance KPIs used by contact centers to measure the performance of agents may include average handle time (AHT), first call resolution (FCR), e.g., percent of customer problems that are resolved in first call, etc. An example of a multi-level challenge may include to achieve AHT of less than 3 minutes for bronze medal and less than 1.5 minutes for gold medal.

It is believed that once a gamification challenge is provided to the agents, the agents will be encouraged to improve their performance on their primary job with relation to measurable KPIs, in order to achieve the goals defined in the gamification challenge and obtain the rewards. Thus, once gamification is deployed with a challenge in place, the expectation is that agents will be engaged with the gamification challenges and hence the overall performance of the agents will increase. However, this may or may not happen depending upon the quality of the challenge and the level of engagement of agents. In addition, for some poorly designed challenges, agent performance may not increase even with high levels of agent engagement.

Currently, there is no way for supervisor and managers to measure the effectiveness of gamification challenges created for the agents to realize the impact of the gamification challenges on agent's performance. Therefore, there is a need to allow automatic measurement and assessment of the effectiveness of gamification challenges.

SUMMARY OF THE INVENTION

According to embodiments of the invention, a computer-based system and method for measuring effectiveness of a gamification challenge may include, using a processor: presenting the gamification challenge on a display to an agent; measuring agent engagement with the gamification challenge over time to calculate agent engagement indices over time; measuring agent performance over time to calculate agent performance indices over time; and calculating a correlation between the agent engagement indices and the agent performance indices to obtain the gamification effectiveness.

According to embodiments of the invention, the agent engagement index may be calculated based on a ratio of the measured agent engagement with engagement of other agents.

According to embodiments of the invention, calculating the agent engagement index may include: measuring agent engagement in relation to each of a plurality engagement parameters; for each engagement parameter, calculating a normalized engagement score based on a ratio of the agent engagement related to the engagement parameter to an engagement parameter goal; and calculating the agent engagement index as a combination of the normalized engagement scores.

According to embodiments of the invention, the engagement index may be a weighted average of the normalized engagement scores.

According to embodiments of the invention, the engagement parameters may include at least one of a view index, a time index and an activity index.

According to embodiments of the invention, the agent performance index may be calculated based on a ratio of the measured agent performance to a performance goal.

According to embodiments of the invention, calculating the agent performance index may include: measuring agent performance in relation to each of a plurality of key performance indicators (KPIs); for each KPI, calculating a normalized performance score based on a ratio of the agent performance related to the KPI to a KPI goal; and calculating the agent performance index as a combination of the normalized performance scores.

According to embodiments of the invention, the KPIs may include at least one of average handle time (AHT), cross talk time (CTT), first call resolution (FCR), and non-speech time (NST).

According to embodiments of the invention, the gamification challenge may include a plurality of levels, each comprising one or more objectives, defined on the performance of the agent in relation to one or more key performance indicator (KPI), and a plurality of rewards, each associated with completion of a level, wherein providing the gamification challenge may include: providing the one or more objectives of a first level to the agent; and providing the reward associated with completion of the first level and the one or more objectives of a second level once the one or more objectives of the first level are achieved by the agent.

According to embodiments of the invention, if the gamification effectiveness is below a first threshold, and the agent engagement indices increase over time, then embodiments may include performing at least one of: increasing at least one of the rewards or decreasing at least one of the qualitative goals; and if the gamification effectiveness is above a second threshold, and the agent engagement indices decrease over time, then embodiments may include performing at least one of: changing the location of the gamification challenge on the display or providing notifications regarding the gamification challenge to the agent.

According to embodiments of the invention, a computer-based system and method for evaluating a gamification challenge may include, using a processor: providing the gamification challenge to a user; measuring user interest in the gamification challenge over time; calculating normalized interest indices of the user over time based on the measured user interest; measuring user achievements over time; calculating normalized user achievements indices over time based on the measured user achievements; and calculating a correlation between the normalized interest indices and the normalized user achievement indices to obtain the gamification effectiveness.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
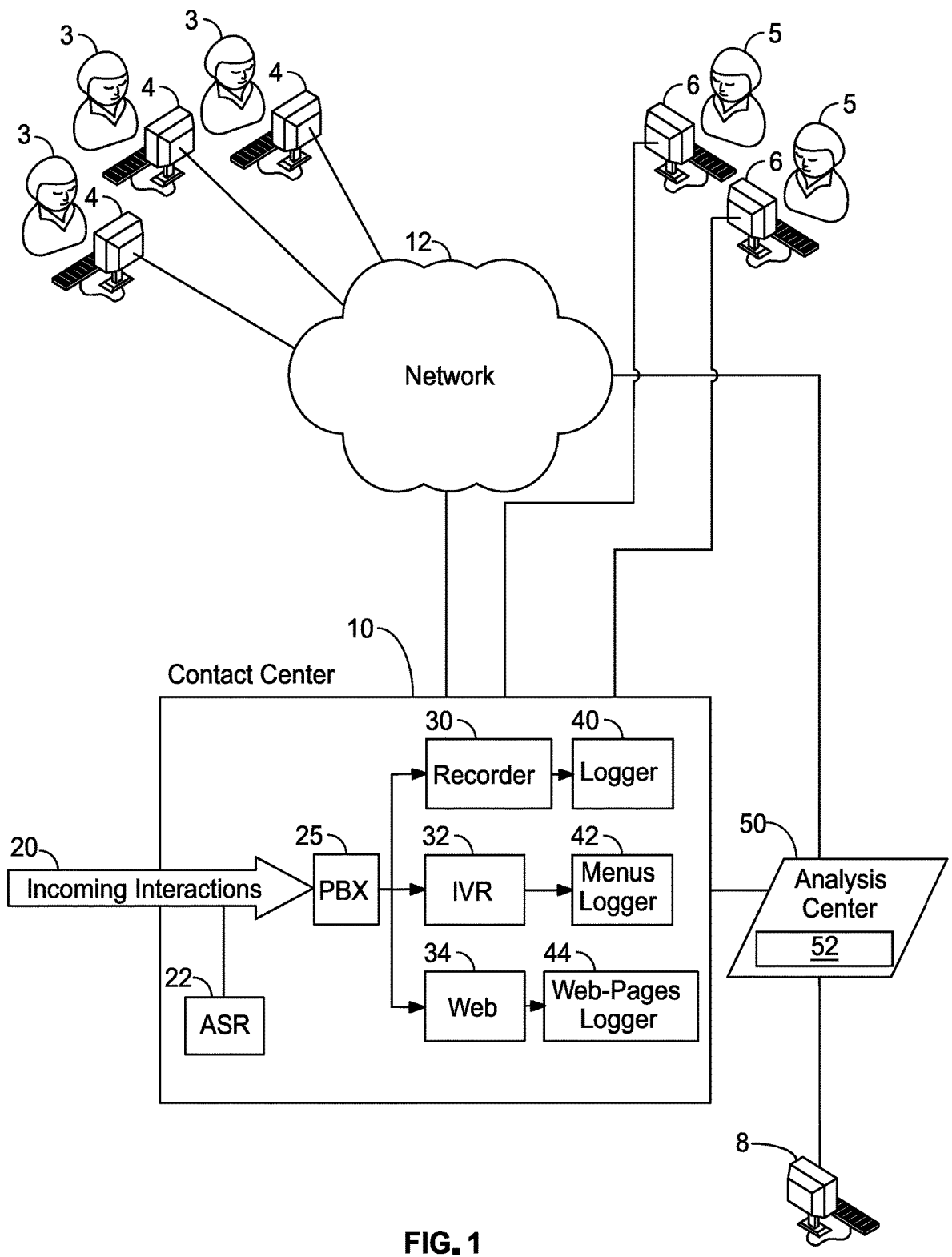
FIG. 1 is a block diagram of a system for presenting gamification challenges and measuring their effectiveness, according to embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Embodiments of the invention may have a computerized process that provides a measure of the effectiveness of gamification challenges on the performance of agents. Embodiments of the invention may provide a gamification effectiveness index or score that provides a measure of the effectiveness of the gamification challenge on an agent who undergoes that challenge. The gamification challenge may include goals that are defined with relation to measurable KPIs used to measure the performance of the agents on their primary job, and rewards that are provided to the agent once a goal is achieved. According to embodiments of the invention, the gamification effectiveness index may be derived from the correlation between the engagement of the agent with the gamification challenge and the performance of the agent on their primary job. Embodiments of the invention may include an engagement index that may provide a measure of the engagement of the agent with the gamification challenge. For example, the engagement index may be calculated as the relative agent's activity as compared to other agent's activity on the gamification module. Embodiments of the invention may include a performance index that may provide a measure of the agent's performance. For example, the performance index may be calculated by comparing the agent's performance against pre decided goals. The gamification effectiveness index may be calculated by correlating the engagement index and the performance index.

Thus, embodiments of the invention may provide a measure of gamification effectiveness and may assess or evaluate if challenges are effective or not. Embodiments of the invention may provide a tool for supervisors and managers to quantitatively evaluate effectiveness of gamification challenges. Furthermore, according to embodiments of the invention, if challenges are not effective the gamification challenges may be adjusted automatically or manually. Accordingly, embodiments of the invention may improve the technology of contact centers, by providing an automatic tool for evaluating and adjusting gamification challenges.

FIG. 1 is a block diagram of a system for measuring effectiveness of a gamification challenge according to embodiments of the present invention. While FIG. 1 shows such a system in the context of a contact center, embodiments of the invention may be used in other contexts. Incoming interactions 20 (e.g., conversations, telephone calls, IVR interactions, etc.) among people 3 (e.g., customers) and agents 5 may enter a contact center 10 and be routed for example by a PBX (private branch exchange) 25 or other equipment to relevant systems, such as interactive voice response (IVR) block or processor 32, Internet sessions or web block 34 and voice interactions block or recorder 30. People 3 may operate external user equipment 4 to communicate with agents 5 via contact center 10; and agents 5 may operate agent terminals 6 for that communication and other purposes. Agent terminals 6 may be configured to present gamification challenges to agents, according to embodiments of the invention. The gamification challenges may be presented to the agents on a display, as part of a graphical user interface (GUI) using a dedicated application of gamification pages in a web browser. For example, a gamification page may include the goals of a level of the gamification challenge, and associated rewards. The gamification pages may also include other functionalities, including a chat box to enable agents to communicate with each other regarding the challenge, a comment box for commenting on the challenge, etc. Incoming interactions 20 may be pre-processed and may enter the system as text data, or may be converted to text via ASR module 22. User terminals 8 may be operated for example, by a supervisors and/or managers. User terminals may provide data regarding gamification effectiveness to supervisors and/or managers, according to embodiments of the invention.

Figure 2:
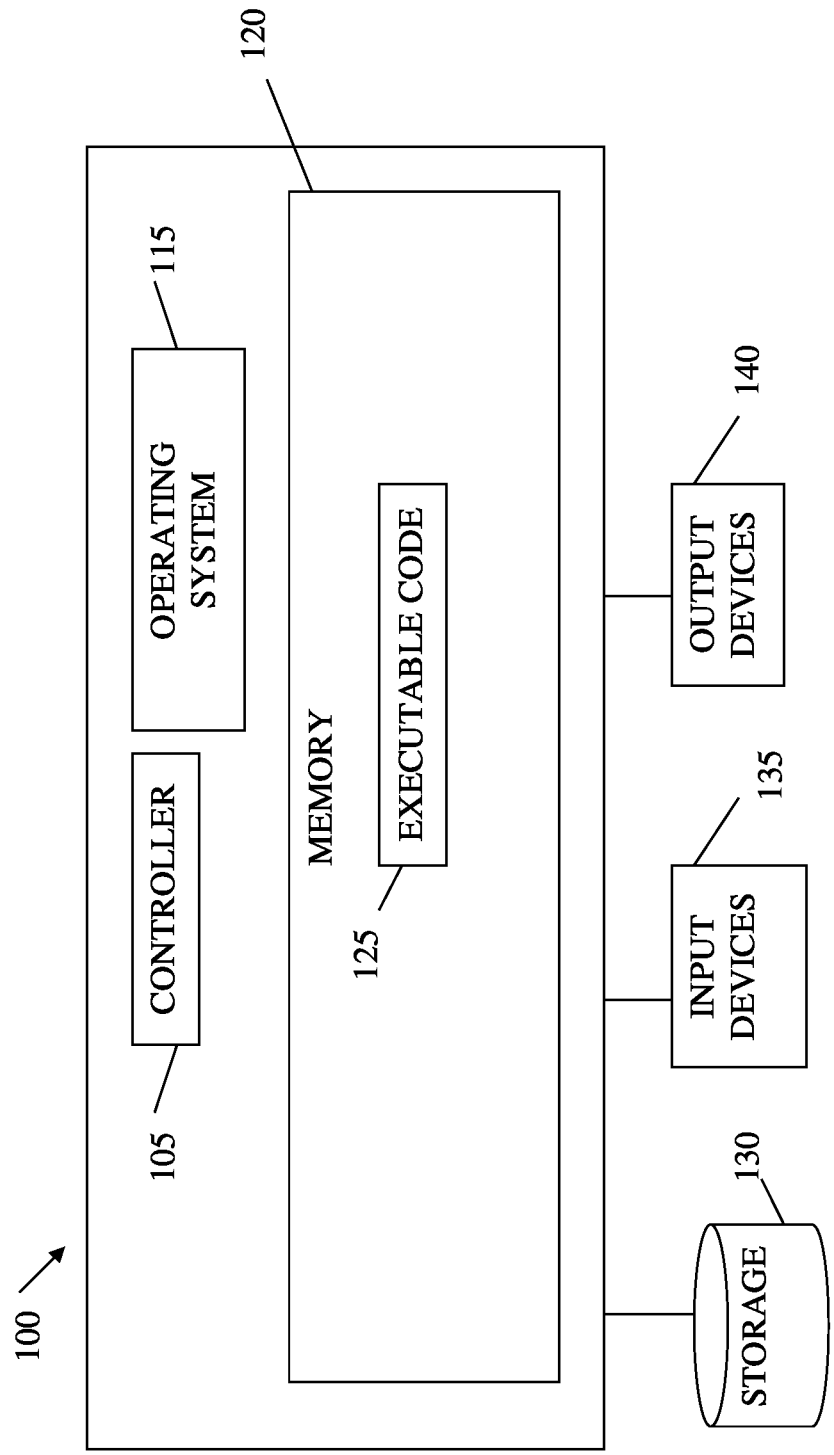
FIG. 2 is a high-level block diagram of an exemplary computing device which may be used with embodiments of the present invention.

User equipment 4, agent terminals 6 and user terminals 8 may include computing or telecommunications devices such as personal computers or other desktop computers, conventional telephones, cellular telephones, portable or tablet computers, smart or dumb terminals, etc., and may include some or all of the components such as a processor shown in FIG. 2.

Interaction data or documents may be stored, e.g., in files and/or databases. For example logger 40, menus logger 42, and web-page logger 44 may record information related to interactions, such as the content or substance of interactions (e.g. recordings and/or transcripts of telephone calls) and metadata (e.g. telephone numbers used, customer identification (ID), etc.). In the case that documents other than interactions are used, other databases may be used. The data from contact center 10 may be output, sent or exported to an analysis center 50, which may be part of contact center 10, or external to and/or remotely located from contact center 10.

Figure 3:
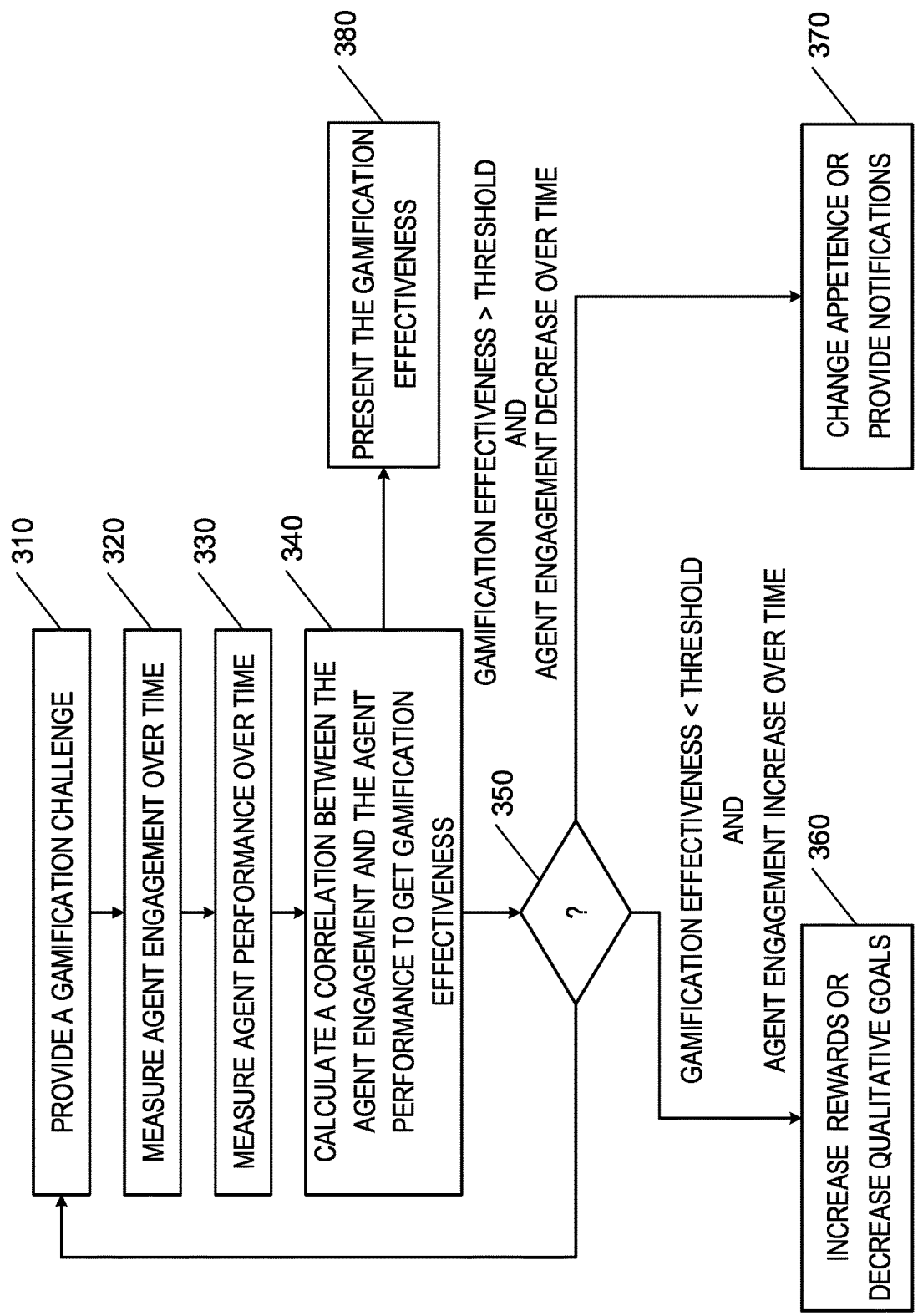
FIG. 3 is a flowchart of a method for measuring effectiveness of a gamification challenge, according to embodiments of the present invention.

Analysis center 50 may perform functions such as those shown in FIG. 3, and may include for example gamification module 52 which may be or may be implemented as software code for providing gamification challenges, and measure the effectiveness of the gamification challenges as disclosed herein. Analysis center 50 may communicate with one or more agent terminals 6 and user terminals 8 to for example collect data and provide visualizations. Analysis center 50 may collect data related to the level of interaction of the agent with the gamification challenge, also referred to as engagement parameters. The data collected may include the number of views of pages related to the gamification module 52, the amount of time spent on gamification module 52 by an agent, the amount of activity in terms of number of liking, commenting and/or sharing in the gamification module 52 done by an agent, and other engagement parameters measuring engagement. Analysis center 50 may collect data related to agent performance in relation to each of a plurality of KPIs. The data collected may include one or more of the following KPIs: average handle time (AHT), cross talk time (CTT), first call resolution (FCR), and non-speech time (NST). Other KPIs may be used. Gamification module 52 may use the collected data to calculate agent performance and agent engagement indices, and to calculate or estimate the effectiveness of the gamification challenge based on those indices, as disclosed herein.

One or more networks 12 may connect equipment or modules not physically co-located, for example connecting external user equipment 4 to contact center 10, and contact center 10 to analysis center 50. Networks 12 may include for example telephone networks, the Internet, or other networks. While in FIG. 1 contact center 10 is shown passing data to analysis center 50, these modules may communicate via a network such as networks 12.

Web block 34 may support web interactions over the Internet (e.g., operate web pages which may be executed in part on user equipment), IVR block 32 may provide menus and other information to customers and for obtaining selections and other information from customers, and recorder 34 may process or record voice sessions with customers. It may be appreciated that contact center 10 presented in FIG. 1 is not limiting and may include any blocks and infrastructure needed to handle voice, text (e.g., SMS (short message service), WhatsApp messages, chats, etc.) video and any type of interaction with customers.

FIG. 2 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140. Each of modules and equipment such as contact center 10, ASR module 22 PBX 25, IVR block 32, voice interactions block or recorder 30, menus logger 42, connect API 34, analysis center 50, external user equipment 4, and agent terminals 6, user terminals 8 and other modules discussed herein may be or include a computing device such as included in FIG. 2, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of possibly different memory units. Memory 120 may store for example, instructions (e.g., code 125) to carry out a method as disclosed herein, and/or data such as queries, documents, interactions, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 3, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as documents or interactions may be stored in a storage 130 and may be loaded from storage 130 into a memory 120 where it may be processed by controller 105. In some embodiments, some of the components shown in FIG. 2 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g., memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 3 is a flowchart of a method for measuring effectiveness of a gamification challenge, according to embodiments of the present invention. While in some embodiments the operations of FIG. 3 are carried out using systems as shown in FIGS. 1 and 2, in other embodiments other systems and equipment can be used.

In operation 310, a processor (e.g., operating gamification module 52) may provide a gamification challenge to an agent or a group of agents. For example, the gamification challenge may be presented on a display, e.g., using output devices 140 of agent terminals 6 using a dedicated application or gamification challenge pages in a web application.

According to some embodiments, a gamification challenge may include a plurality of levels, each including one or more objectives. A gamification objective may include a qualitative goal defined on the performance of the agent in relation to one or more KPIs, and a plurality of rewards, each associated with completion of a level. Providing the gamification challenge may include providing (e.g., presenting on a display) the one or more objectives of a level to the agent. Once the one or more objectives of a level are achieved by the agent the reward associated with completion of that level may be provided to the agent and the gamification challenge may move to a next level by providing the one or more objectives of the next level.

In some implementations, a gamification challenge may include a competition between agents based on a single KPI or on a set of KPIs. Additionally or alternatively, a challenge may be designed in such a way to achieve a common goal for a team or a group of agents. A challenge may include multiple levels and a level may be made up of one or more objectives. Usually, levels get difficult to complete as the challenge progresses. An objective may be a condition or criterion defined on one or more metric or KPI. Gamification challenges may include badges or rewards that symbolizes achievement and are provided to agents or groups of agents once an objective or a level is achieved. Supervisors and managers typically create a challenge for their agents. They may set multiple levels within a challenge. Each level may have few objectives where each objective is associated with achieving performance goals.

Once a challenge is created, agents may be assigned to the challenge. The gamification challenge, e.g., the objectives associated with a certain level, may be presented to the agents. According to some embodiments, a gamification module may display pages (e.g., in a browser or in a dedicated application) including information related to the challenge, levels and objectives. Additionally, the gamification module may display pages where respective rank of each agent in an ongoing challenge may be seen relative to other agents. If engaged to the challenge, the agents may focus on meeting the objectives of each level. The agent's ongoing performance, e.g., relevant KPI values, may be compared with the level objectives. If the relevant KPI values meet the objective criterion of that level, then that objective is marked as complete. If all objectives of a level are complete, the level is marked as complete. Once a level is complete, rewards, badges or points may be awarded to the agents and the gamification challenge may proceed to the next level. If there are no levels remaining to be completed for an agent, the challenge may be marked as completed for that agent.

In operation 320, the processor may measure agent or user interest, interaction or engagement with the gamification challenge over time and calculate agent engagement indices, also referred to as normalized interest indices. For example, to measure interest, analysis center 50 or other components of the contact center may collect data related to the level of interaction of the agent with the gamification challenge, also referred to as engagement parameters. The data collected may include the number of views of the agent of pages related to the gamification module 52, the amount of time spent on gamification module 52 by an agent, the amount of activity of the agent in terms of number of liking, commenting and/or sharing in the gamification module 52, and other engagement parameters. For example, the gamification pages may provide functionalities that may enable agents to provide comments on the gamification challenge, goals, levels or rewards, to share gamification pages or other data related to the gamification challenge, and link information to the gamification pages. These and other activities may be measured and provide an estimate of the agent engagement with the gamification challenge.

According to some embodiments, the agent engagement index may be calculated every predefined time interval or period from the beginning to the end of the gamification challenge. Thus, the processor may calculate a series of agent engagement indices versus or over time. According to some embodiments, the agent engagement index may be a ratio of the measured agent engagement to engagement of other agents. For example, calculating the agent engagement index may include measuring agent engagement in relation to each of a plurality of engagement parameters. For each engagement parameter, a normalized engagement score may be calculated based on a ratio of the agent engagement related to the engagement parameter to an engagement parameter goal. An agent engagement index may be calculated as a combination (e.g., weighted average) of the normalized engagement scores. In some embodiments the engagement parameter goal may equal engagement of other agents with relation to the same engagement parameter.

According to some embodiments, the engagement parameters may include one or more of a view index, a time index and an activity index. For example, the view index may be the relative number of the agent views of pages related to the gamification challenge or module with respect to a target number of views. The target number of views may be, for example, the average, maximum or other function on the number of views of a group of agents, e.g., the agents to which the challenge was given, or a group of peers of the agent. The time index may be, for example, the amount of time spent on the gamification module by an agent with respect to a target time spent. The target time spent may be, for example, the average, maximum or other function on time spent of the group of agents. The activity index may be, for example, the amount of activity in terms number of liking, commenting and/or sharing in the gamification module done by an agent with respect a target amount of activity. The target amount of activity may be, for example, the average, maximum or other function on amount of activity of the group of agents.

For example, the view index may be calculated by:

$$\text{View Index}_i = \frac{NumViews_i}{\text{Max}(NumViews_1, NumViews_2 \ldots, NumViews_n)} \quad \text{(Equation 1)}$$

Where $NumViews_i$ is the number of views of pages related to the gamification module by agent i. The time index may be calculated by:

$$\text{Time Index}_i = \frac{TimeSpent_i}{\text{Max}(TimeSpent_1, TimeSpent_2 \ldots, TimeSpent_n)} \quad \text{(Equation 2)}$$

Where $TimeSpent_i$ is the amount of time spent on the gamification module by an agent i. The activity index may be calculated by:

$$\text{Activity Index}_i = \frac{NumActivity_i}{\text{Max}(NumActivity_1, NumActivity_2, \ldots, NumActivity_n)} \quad \text{(Equation 3)}$$

Where $NumActivity_i$ is the amount of time spent on gamification module by agent i.

The engagement index may then be calculated for an agent as a weighted average of the view index, a time index and an activity index.

$$\text{Engagement Index} = \frac{w1 * \text{Time Index} + w2 * \text{View Index} + w3 * \text{Activity Index}}{\sum_{i=1}^{3} w_i} \quad \text{(Equation 4)}$$

Where $w_i$ are the weights of the respective engagement parameters. Other parameters, equations and calculations may be used.

In operation 330, the processor may measure agent performance or achievements in their primary job over time and calculate agent performance indices, also referred to as user achievement indices. While agents engage with the gamification challenge, they may continue their primary job of serving customer calls in the contact center with a focus on improving their performance. Analysis center 50 or other components of the contact center may collect data related to agent performance in relation to or measured by each of a plurality of KPIs. The data collected may include one or more of the following KPIs: AHT, CTT, FCR, and NST. Other KPIs may be used. According to some embodiments, the agents' performance may be calculated every predefined time interval from the beginning to the end of the gamification challenge. Thus, the processor may calculate a series of agent performance indices versus or over time. According to some embodiments, the agent performance index may be calculated based on a ratio of the measured agent performance to a performance goal. For example, calculating the agent performance index may include measuring agent performance in relation to each of a plurality of KPIs, for each KPI, calculating a normalized performance score based on a ratio of the agent's performance related to the KPI to a KPI goal, and calculating the agent performance index as a combination of the normalized performance scores.

For example, AHT may be the elapsed time (e.g., in seconds) from when an agent answers a call to when the agent disconnects the call. For AHT KPI, lower KPI values are better. CTT may be the time duration (e.g., in seconds) in which an agent is speaking over the customer or not allowing them to complete talking. For CTT KPI, lower KPI values are better. FCR may be the number of times in a day in which an agent is able to resolve customer's issues in first contact without transfer, escalate or return the call. For FCR KPI, higher KPI values are better. The NST may be the elapsed time (e.g., in seconds) when there is a considerable silence on the call. For NST KPI, lower KPI values are better. The input data for calculation of KPIs may be measured or obtained by analysis center 50 or other components of the contact center.

According to some embodiments, normalized performance scores (NPS) may be calculated with relation to a performance goal value associated for respective performance KPI. For example, the performance goal value may be defined by the supervisor or manager. The calculation formula for an NPS slightly differs considering whether the higher KPI values are better or the lower KPI values are better. For example, for cases where higher KPI values are better, NPS may be calculated by:

$$NPS = \frac{KPI \text{ Value}}{\text{Goal Value}} \quad \text{(Equation 5)}$$

For cases where lower KPI values are better, NPS may be calculated by:

$$NPS = \frac{\text{Goal Value}}{KPI \text{ Value}} \quad \text{(Equation 6)}$$

Where KPI Value is the value of KPI achieved by the agent, and Goal Value is the goal value set by the supervisor. In either case, the higher the normalized performance score, the better is the performance of the agent. Other calculations may be used.

The performance index may be an aggregated measure of an agent performance. For example, the performance index may be calculated as weighted average or other function or combination of the NPSs. For example, the performance index may be calculated by:

$$\text{Performance Index} = \frac{\sum_{i=1}^{n} w_i * NPS_i}{\sum_{i=1}^{n} w_i} \quad \text{(Equation 7)}$$

Where n is the number of KPIs, $w_i$ are the weights, $NPS_i$ is the NPS for the $i^{th}$ KPI (e.g., AHT, NST, CTT and CFR. Other KPIs and calculations may be used.

In operation 340, the processor may calculate a correlation or comparison between the agent engagement indices and the agent performance indices to obtain the gamification effectiveness or gamification effectiveness index. The gamification effectiveness index for a gamification challenge may indicate whether that challenge is effective enough to improve the performance of a given agent. According to some embodiments, the gamification effective index may be calculated as a correlation coefficient of the series of agent engagement indices and the series of agent performance indices. For example, the gamification effectiveness index may be calculated by:

$$r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad \text{(Equation 8)}$$

Where $r_{xy}$ is the gamification effectiveness index, n is the size of the series, $x_i$ is the agent performance index value which is indexed with i, $y_i$ is the agent engagement index value which is indexed with i, $\bar{x}$ is the mean performance index calculated by $$\bar{x} = \frac{1}{n}\sum_{i=1}^{n} x_i,$$

$\bar{y}$ is the mean engagement index calculated by $$\bar{y} = \frac{1}{n}\sum_{i=1}^{n} y_i.$$

In operation 350, the gamification effectiveness may be evaluated together with the agent engagement. For example, if the gamification effectiveness is below a first threshold, and the agent engagement indices increase over time, it may be an indication that the agent is engaged with the gamification challenge, but the gamification challenge is not well designed. Thus, an action may be required to change the gamification strategy or design. For example, the processor may change the contents (e.g., goals and/or rewards) of the gamification challenge. e.g., the processor may perform at least one of: increasing at least one of the rewards or decreasing at least one of the qualitative goals, as indicated in operation 360. If, however, the gamification effectiveness is below a first threshold, and the agent engagement indices decrease over time, it may mean that the performance of the agent increase regardless of the gamification challenge. Thus, intervention of a human operator or supervisor may be required to evaluate the scenario.

If the gamification effectiveness is above a second threshold, and the agent engagement indices decrease over time, it may be an indication that the gamification challenge is effective, but the agent is not engaged with the gamification challenge. Thus, the processor may perform actions to increase agents awareness to the gamification challenge. For example, the processor may perform at least one of: changing the presentation or appearance of the gamification challenge on the display, e.g., location, fonts colors, etc., or providing notifications regarding the gamification challenge to the agent, as indicated in operation 370. Other actions may be taken.

If the gamification effectiveness is above the second threshold, and the agent engagement indices increase over time, it may be an indication that the gamification challenge is effective, and that the agent is engaged with the gamification challenge. This is a desired situation, and hence no change may be required. Thus, the gamification challenge may continue unaltered until all the goals in the gamification challenge are achieved and the gamification challenge expires.

If the gamification effectiveness is above the first threshold and below the second threshold, then no concrete conclusion may be made regarding the effectiveness of the gamification challenge. Thus, further investigations may be made, e.g., manually, or automatically. In some embodiments, a notification may be provided to the operator or supervisor that manual intervention is required to analyze the scenario.

In operation 380, the gamification effectiveness may be presented to a user, e.g., a supervisor or manager. In some embodiments, the notification may include an indication of whether the agent engagement indices increase or decrease over time as this data may help evaluate the scenario. The supervisor or manager may thus obtain valuable data regarding the effectiveness of the gamification challenge, and may alter, stop, or continue with the gamification challenge based on this data.

In some embodiments operations 350-380 may be performed per agent, or per a group of agents, e.g., on average values of the gamification effectiveness and engagement indices. Thus, an action may be taken per agent basis or for a group of agents together. In some embodiments, the first threshold me be in the range of 0.3-0.4 and the second threshold may be in the range of 0.5-0.6. Other thresholds may be used.

The following will provide an example of a gamification challenge and calculation of effectiveness of the gamification challenge, according to embodiments of the invention. Table 1 presents an example gamification challenge provided to the agent. The example gamification challenge includes 4 levels, each including four objectives. The objectives include a quotative goal defined on the performance of the agent in relation to the following KPIs: AHT, FCR, CTT and NST. The gamification challenge also includes rewards for completing each level. For example, level 1 will be completed when 'AHT is <180 seconds (sec)', TCR is at least 5', 'CTT is at least 20 seconds' and 'NST is <25 seconds'. The reward for completing level 1 of the gamification challenge is 15 points. The duration of the example gamification challenge is 16 weeks.

TABLE 1

An example of a gamification challenge.

| | AHT | FCR | CTT | NST | AWARDS |
|---|---|---|---|---|---|
| Level 1 | <180 sec | At least 5 | <20 sec | <25 sec | 15 Points |
| Level 2 | <150 sec | At least 10 | <17 sec | <18 sec | 25 Points |
| Level 3 | <120 sec | At least 15 | <13 sec | <15 sec | 35 Points |
| Level 4 | <90 sec | At least 25 | <7 sec | <10 sec | 45 Points |

Once the gamification challenge is created and assigned to agents, the gamification challenge may be provided to the agents and displayed on agent terminals 6, as a dedicated application or in gamification pages in a browser. Agents may also be presented a leaderboard where they can see the progress of themselves and other agents in the gamification challenge, namely how many levels they have completed, how many points they have earned and their respective rank.

Figure 4:
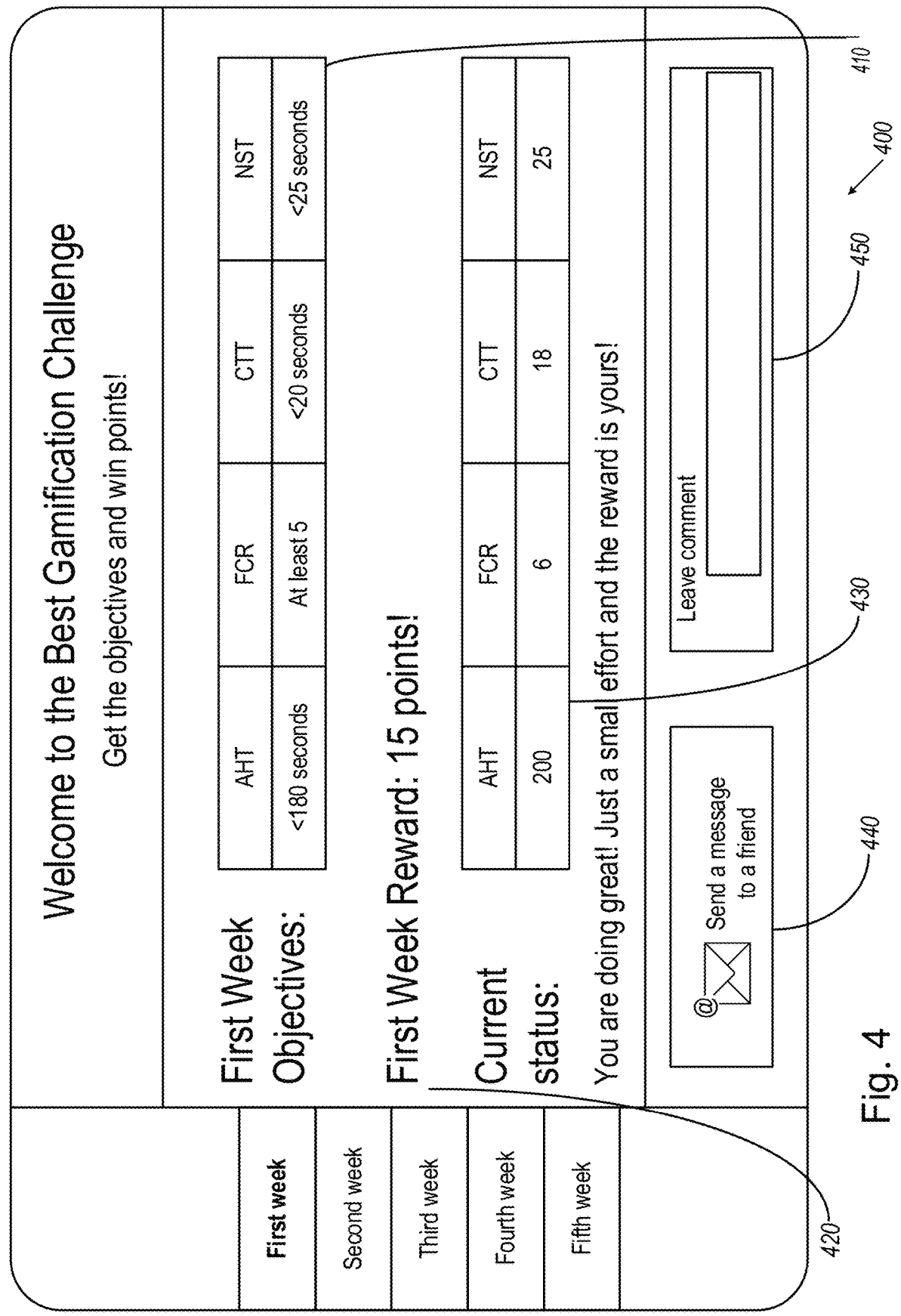
FIG. 4 presents an example for a gamification page, according to embodiments of the invention.

An example for a gamification page 400 is presented in FIG. 4. The example gamification page 400 includes a specification of the current objectives 410, the reward for achieving the objective 420, a current status of the agent 430, an icon for sending a message to a colleague 440 and a comment box 450. Embodiments of the invention may measure the number of times the agent views this and other gamification pages 400, the number of times that agent shares the page and the number of comments the agent writes, to evaluate that agent engagement.

Figure 5:
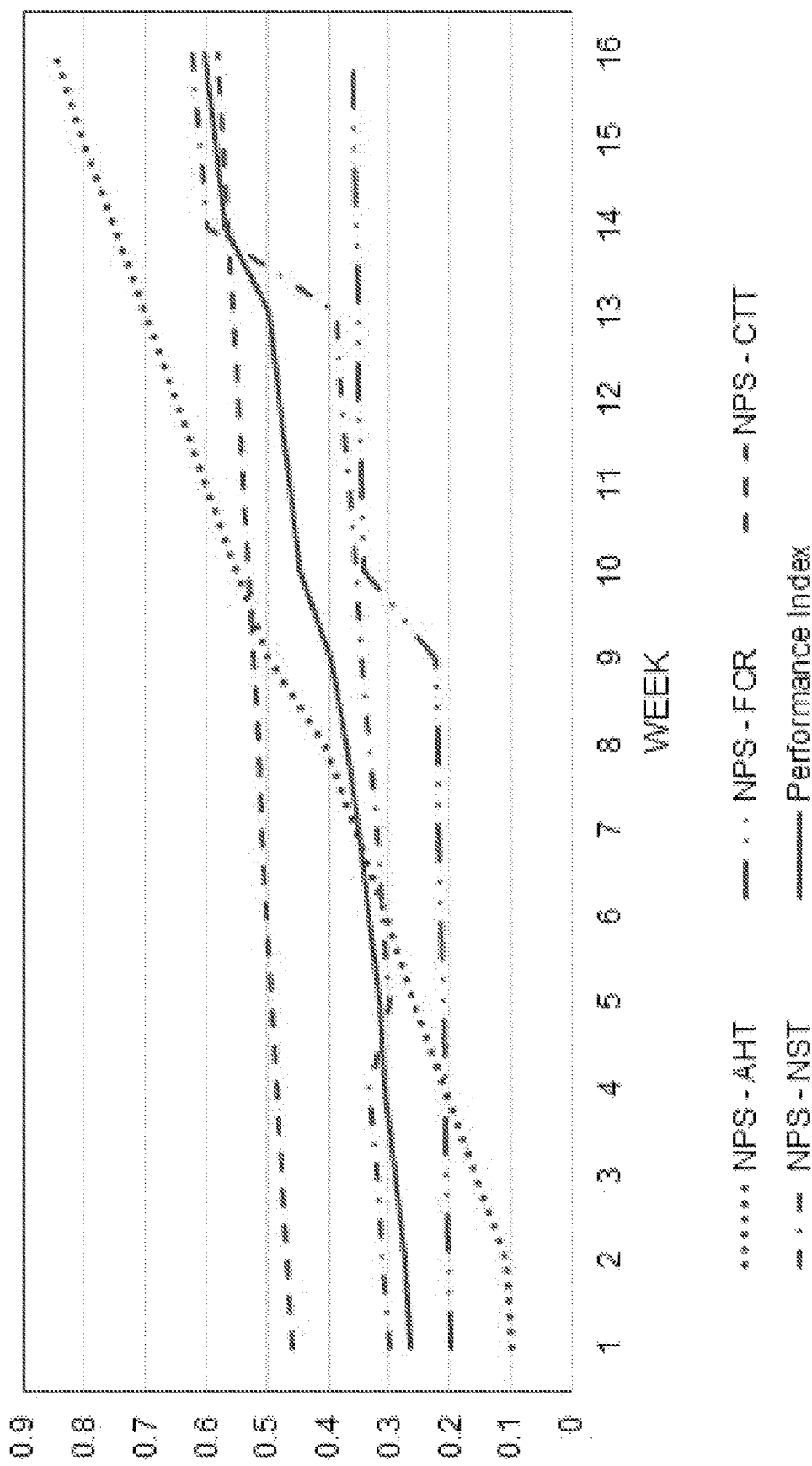
FIG. 5 presents an example of NPS values of AHT, CFR, CTT and NST performance KPIs of an agent, and the performance indices of an agent for sixteen weeks of a gamification challenge, according to embodiments of the present invention.

While agents engage with the gamification challenge, they may continue their primary job of serving customer calls in the contact center with a focus on improving their performance. As time progresses, analysis center 50 or other components of the contact center may collect data related to the level of interaction or engagement of the agent with the gamification challenge and performance data. An example of performance data collected on five agents is presented in Table 2. Table 2 presents AHT data collected on five agents during a first week of the gamification challenge, and corresponding NPS values. The daily AHT columns present the raw data, e.g., the AHV as measured for each agent. The NPS-AHT columns present the AHT after normalization, e.g., according to Equation 6. Table 3 and FIG. 5 present an example of NPS values of AHT, CFR, CTT and NST performance KPIs of an agent (agent 1), and the performance indices of the agent for each week of the gamification challenge. It can be seen that for this agent the performance indices generally increase as the gamification challenge progresses.

Tables 4, 5 and 6 present time index, view index and the activity index measured for the five agents during the first week of the gamification challenge, respectively. The tables present the raw engagement parameters measured for each agent, and the corresponding engagement index.

TABLE 2

An example of AHT data collected on five agents during a first week of the gamification challenge, and corresponding NPS values.

| | Daily AHT | | | | | Daily NPS-AHT | | | | | Average NPS-AHT |
|---|---|---|---|---|---|---|---|---|---|---|---|
| | Day 1 | Day 2 | Day 3 | Day 4 | Day 5 | Day 1 | Day 2 | Day 3 | Day 4 | Day 5 | |
| Agent1 | 900 | 1000 | 800 | 700 | 1300 | 0.10 | 0.09 | 0.11 | 0.13 | 0.07 | 0.1 |
| Agent2 | 450 | 500 | 400 | 300 | 700 | 0.20 | 0.18 | 0.23 | 0.30 | 0.13 | 0.2 |
| Agent3 | 800 | 700 | 650 | 500 | 900 | 0.11 | 0.13 | 0.14 | 0.18 | 0.10 | 0.1 |
| Agent4 | 250 | 350 | 300 | 700 | 900 | 0.36 | 0.26 | 0.30 | 0.13 | 0.10 | 0.2 |
| Agent5 | 500 | 700 | 600 | 400 | 800 | 0.18 | 0.13 | 0.15 | 0.23 | 0.11 | 0.2 |

TABLE 3

An example of NPS values of AHT, CFR, CTT and NST performance KPIs of an agent.

| AGENT1 | NPS - AHT | NPS - FCR | NPS - CTT | NPS - NST | Performance Index |
|---|---|---|---|---|---|
| Week 1 | 0.1 | 0.2 | 0.45 | 0.3 | 0.2625 |
| Week 2 | 0.108 | 0.203 | 0.458 | 0.3112 | 0.27005 |
| Week 3 | 0.158 | 0.206 | 0.466 | 0.3224 | 0.2881 |
| Week 4 | 0.208 | 0.209 | 0.474 | 0.3336 | 0.30615 |
| Week 5 | 0.258 | 0.212 | 0.482 | 0.3 | 0.313 |
| Week 6 | 0.308 | 0.215 | 0.49 | 0.3112 | 0.33105 |
| Week 7 | 0.358 | 0.218 | 0.498 | 0.3224 | 0.3491 |
| Week 8 | 0.408 | 0.221 | 0.506 | 0.3336 | 0.36715 |
| Week 9 | 0.5 | 0.224 | 0.514 | 0.3448 | 0.3957 |
| Week 10 | 0.55 | 0.342 | 0.522 | 0.356 | 0.4425 |
| Week 11 | 0.6 | 0.345 | 0.53 | 0.3672 | 0.46055 |
| Week 12 | 0.65 | 0.348 | 0.538 | 0.3784 | 0.4786 |
| Week 13 | 0.7 | 0.351 | 0.546 | 0.3896 | 0.49665 |
| Week 14 | 0.75 | 0.354 | 0.554 | 0.6 | 0.5645 |
| Week 15 | 0.8 | 0.357 | 0.562 | 0.6112 | 0.58255 |
| Week 16 | 0.85 | 0.36 | 0.57 | 0.6224 | 0.6006 |

TABLE 4

The amount of time spent on the gamification module by each agent, and the corresponding time index.

| | Day1 | Day2 | Day3 | Day4 | Day5 | Weekly Sum | Time Index |
|---|---|---|---|---|---|---|---|
| Agent1 | 120 | 100 | 140 | 107 | 133 | 600 | 0.40 |
| Agent2 | 180 | 220 | 160 | 243 | 97 | 900 | 0.60 |
| Agent3 | 10 | 5 | 10 | 3 | 6 | 34 | 0.02 |
| Agent4 | 325 | 275 | 280 | 400 | 220 | 1500 | 1.00 |
| Agent5 | 70 | 70 | 70 | 40 | 20 | 270 | 0.18 |

TABLE 5

The number of views of pages related to the gamification module by each agent, and the corresponding view index.

| | Day1 | Day2 | Day3 | Day4 | Day5 | Weekly Sum | View Index |
|---|---|---|---|---|---|---|---|
| Agent1 | 25 | 19 | 29 | 42 | 20 | 135 | 0.50 |
| Agent2 | 20 | 12 | 21 | 11 | 17 | 81 | 0.30 |
| Agent3 | 10 | 5 | 10 | 3 | 6 | 34 | 0.13 |
| Agent4 | 4 | 10 | 15 | 20 | 10 | 59 | 0.22 |
| Agent5 | 70 | 70 | 70 | 40 | 20 | 270 | 1.00 |

TABLE 6

The amount of activity in the gamification module done by each agent, and the corresponding activity index.

|  | Day1 | Day2 | Day3 | Day4 | Day5 | Weekly Sum | Activity Index |
|---|---|---|---|---|---|---|---|
| Agent1 | 26 | 15 | 30 | 40 | 10 | 121 | 0.40 |
| Agent2 | 40 | 10 | 15 | 30 | 26 | 121 | 0.40 |
| Agent3 | 10 | 5 | 10 | 3 | 6 | 34 | 0.13 |
| Agent4 | 4 | 10 | 15 | 20 | 10 | 59 | 0.22 |
| Agent5 | 70 | 70 | 70 | 40 | 20 | 270 | 1.00 |

Figure 6:
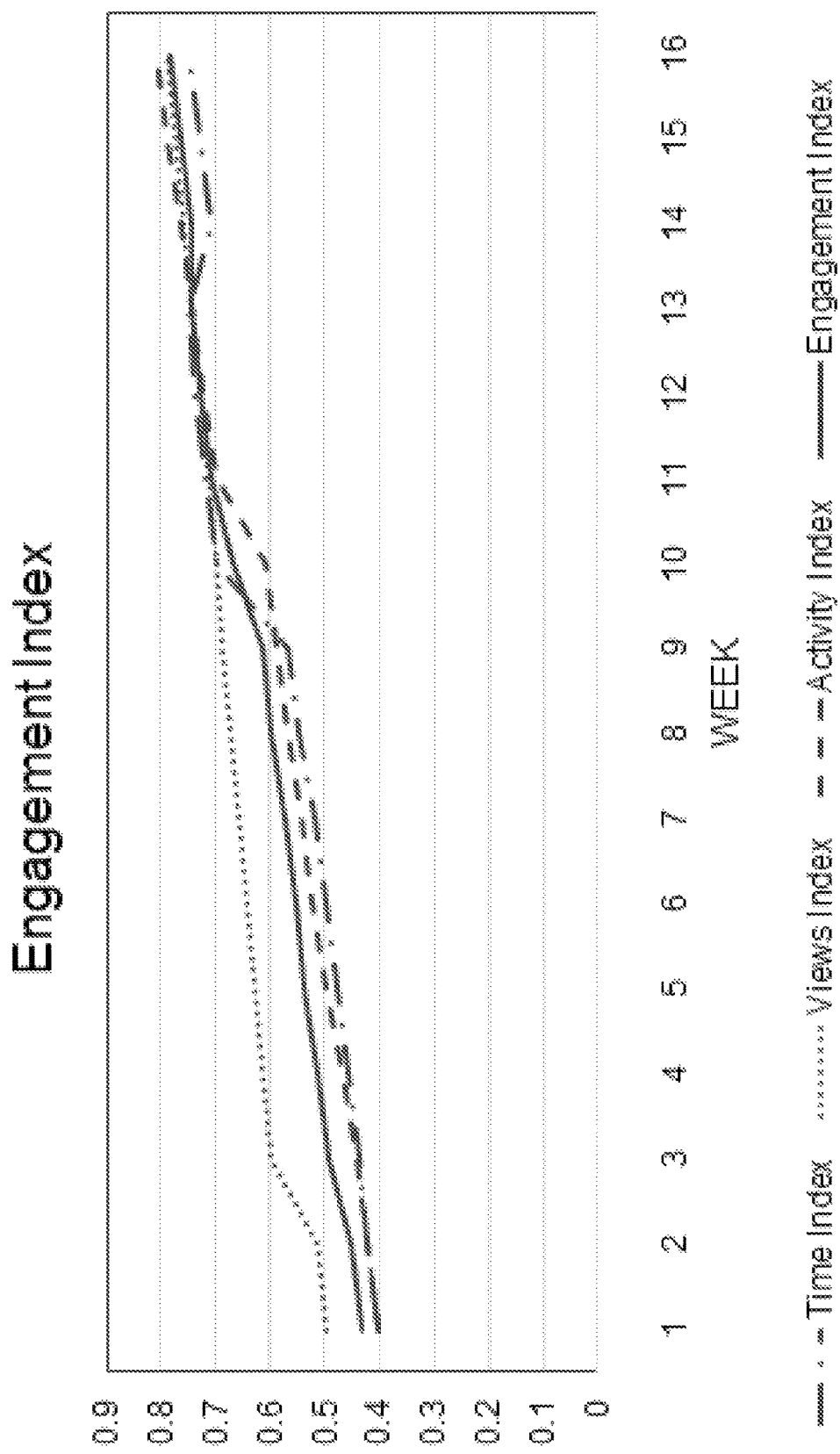
FIG. 6 presents the engagement indices calculated for an agent for sixteen weeks of a gamification challenge, according to embodiments of the present invention.

Table 7 and FIG. 6 present the engagement indices calculated for agent 1 for the entire gamification challenge. It can be easily seen that the engagements indices generally rise as the challenge progresses.

TABLE 7

The example engagement indices calculated for agent 1 for the entire gamification challenge.

| AGENT1 | Time Index | Views Index | Activity Index | Engagement Index |
|---|---|---|---|---|
| Week 1 | 0.4 | 0.5 | 0.4 | 0.433 |
| Week 2 | 0.42 | 0.515 | 0.422 | 0.45203 |
| Week 3 | 0.44 | 0.6 | 0.444 | 0.49416 |
| Week 4 | 0.46 | 0.615 | 0.466 | 0.51319 |
| Week 5 | 0.48 | 0.63 | 0.5 | 0.5363 |
| Week 6 | 0.5 | 0.645 | 0.522 | 0.55533 |
| Week 7 | 0.52 | 0.66 | 0.544 | 0.57436 |
| Week 8 | 0.55 | 0.675 | 0.566 | 0.59669 |
| Week 9 | 0.57 | 0.69 | 0.588 | 0.61572 |
| Week 10 | 0.7 | 0.7 | 0.61 | 0.6694 |
| Week 11 | 0.72 | 0.715 | 0.7 | 0.71155 |
| Week 12 | 0.74 | 0.73 | 0.722 | 0.73058 |
| Week 13 | 0.75 | 0.745 | 0.744 | 0.74631 |
| Week 14 | 0.71 | 0.76 | 0.766 | 0.74554 |
| Week 15 | 0.73 | 0.775 | 0.788 | 0.76457 |
| Week 16 | 0.75 | 0.79 | 0.81 | 0.7836 |

Using the performance indices presented in Table 3 and the engagement indices presented in Table 7, the gamification effectiveness may be calculated or estimated by calculating the correlation between the engagement indices of agent 1 and the performance indices of agent 1. In this example, the gamification effectiveness index is 0.97. Thus, the effectiveness of the gamification challenge is high.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for measuring effectiveness of a gamification challenge, the method comprising, using a computer processor:

in a server comprising the computer processor and a private branch exchange routing, and connected by a network to one or more agent terminals each comprising a terminal computer processor, the private branch exchange routing interactions to agent terminals:

presenting the gamification challenge on an agent terminal;

collecting from the agent terminal a plurality of engagement parameters related to the level of interaction of the agent with the gamification challenge via the agent terminal, the plurality of agent parameters comprising an amount of time spent by the agent on the gamification challenge, and collecting data related to agent performance in relation to a plurality of key performance indicators (KPIs), at least one of the KPIs comprising an elapsed time from when the agent answers a call to when the agent disconnects the call;

measuring, by the processor, agent engagement with the gamification challenge over time, the measuring of agent engagement describing a level of interaction of the agent with the gamification challenge, to calculate agent engagement indices over time for a plurality predefined time intervals from a beginning to an end of the gamification challenge, the calculating of the engagement indices comprising:

measuring agent engagement in relation to each of the plurality of engagement parameters;

for each engagement parameter, calculating, by the processor, a normalized engagement score based on a ratio of the agent engagement related to the engagement parameter to an engagement parameter goal; and calculating, by the processor, the agent engagement index as a combination of the normalized engagement scores;

measuring, by the processor, agent performance over time relative to the routed interactions to calculate agent performance indices over time for the plurality of predefined time intervals from the beginning to the end of the gamification challenge, the calculating of the performance indices comprising:

measuring agent performance in relation to each of the KPIs;

for each KPI, calculating, by the processor, a normalized performance score based on a ratio of the agent performance related to the KPI to a KPI goal; and calculating, by the processor, the agent performance index as a combination of the normalized performance scores;

calculating, by the processor, a correlation between the agent engagement indices and the agent performance indices to obtain the gamification effectiveness, wherein the gamification effectiveness indicates whether corresponding gamification challenges are effective enough to improve the performance of the agent; and providing a notification regarding the gamification challenge to a supervisor, the notification including an indication of whether the engagement indices increase or decrease over time.

2. The method of claim 1, wherein the agent engagement index is calculated based on a ratio of the measured agent engagement with engagement of other agents.

3. The method of claim 1, wherein the engagement index is a weighted average of the normalized engagement scores.

4. The method of claim 1, wherein the engagement parameters comprise at least one of a view index, a time index and an activity index.

5. The method of claim 1, wherein the agent performance index is calculated based on a ratio of the measured agent performance to a performance goal.

6. The method of claim 1, wherein the KPIs comprise at least one of average handle time (AHT), cross talk time (CTT), first call resolution (FCR), and non-speech time (NST).

7. The method of claim 1, wherein the gamification challenge comprises a plurality of levels, each comprising one or more objectives, defined on the performance of the agent in relation to one or more key performance indicator (KPI), and a plurality of rewards, each associated with completion of a level, wherein providing the gamification challenge comprises:

providing the one or more objectives of a first level to the agent; and providing the reward associated with completion of the first level and the one or more objectives of a second level once the one or more objectives of the first level are achieved by the agent.

8. The method of claim 7, comprising:

if the gamification effectiveness is below a first threshold, and the agent engagement indices increase over time, then performing at least one of: increasing at least one of the rewards or decreasing at least one of the qualitative goals; and if the gamification effectiveness is above a second threshold, and the agent engagement indices decrease over time, then performing at least one of: changing the location of the gamification challenge on a display or providing notifications regarding the gamification challenge to the agent.

9. A method for evaluating a gamification challenge, the method comprising, using a computer processor:

in a server comprising the computer processor and a private branch exchange routing, and connected by a network to one or more agent terminals each comprising a terminal computer processor including a plurality of computing devices, the private branch exchange routing interactions so agent terminals:

providing the gamification challenge to an agent terminal;

collecting from an agent terminal a plurality of engagement parameters related to the level of interaction of the agent with the gamification challenge via the agent terminal, the plurality of agent parameters comprising an amount of time spent by the agent on the gamification challenge, and collecting data related to agent performance in relation to a plurality of key performance indicators (KPIs), at least one of the KPIs comprising an elapsed time from when the agent answers a call to when the agent disconnects the call;

measuring, by the processor, agent interest in the gamification challenge over time, the measuring of agent interest describing a level of interaction of the agent with the gamification challenge, to calculate user engagement indices over time for a plurality predefined time intervals from a beginning to an end of the gamification challenge, the calculating of the engagement indices comprising:

measuring agent interest in relation to each of the plurality of interest parameters;

for each interest parameter, calculating, by the processor, a normalized interest score based on a ratio of the user interest related to the interest parameter to an interest parameter goal; and calculating, by the processor, the user interest index as a combination of the normalized interest scores;

measuring, by the processor, agent achievements over time relative to the routed interactions to calculate agent achievement indices over time for the plurality of predefined time intervals from the beginning to the end of the gamification challenge, the calculating of the achievement indices comprising;

measuring agent achievement in relation to each of the KPIs;

for each KPI, calculating, by the processor, a normalized achievement score based on a ratio of the agent achievement related to the KPI to a KPI goal; and calculating, by the processor, the agent achievement index as a combination of the normalized achievement scores;

calculating, by the processor, a correlation between the normalized interest indices and the normalized agent achievement indices to obtain the gamification effectiveness, wherein the gamification effectiveness indicates whether corresponding gamification challenges are effective enough to improve the performance of the agent; and providing a notification regarding the gamification challenge to a supervisor, the notification including an indication of whether the interest indices increase or decrease over time.

10. A system for measuring effectiveness of a gamification challenge, comprising:

a server comprising a computer processor, a memory, and a private branch exchange routing, and connected by a network to one or more agent terminals each comprising a terminal computer processor, the private branch exchange routing interactions to agent terminals;

wherein the processor is configured to:

present the gamification challenge on an agent terminal;

collect from the agent terminal a plurality of engagement parameters related to the level of interaction of the agent with the gamification challenge via the agent terminal, the plurality of agent parameters comprising an amount of time spent by the agent on the gamification challenge, and collecting data related to agent performance in relation to a plurality of key performance indicators (KPIs), at least one of the KPIs comprising an elapsed time from when the agent answers a call to when the agent disconnects the call;

measure agent engagement with the gamification challenge over time, the measuring of agent engagement describing a level of interaction of the agent with the gamification challenge, to calculate agent engagement indices over time for a plurality predefined time intervals from a beginning to an end of the gamification challenge, the calculating of the engagement indices comprising:

measuring agent engagement in relation to each of the plurality of engagement parameters;

for each engagement parameter, calculating a normalized engagement score based on a ratio of the agent engagement related to the engagement parameter to an engagement parameter goal; and calculating the agent engagement index as a combination of the normalized engagement scores;

measure agent performance over time relative to the routed interactions to calculate agent performance indices over time for the plurality of predefined time intervals from the beginning to the end of the gamification challenge, the calculating of the performance indices comprising:

measuring agent performance in relation to each of KPIs;

for each KPI, calculating a normalized performance score based on a ratio of the agent performance related to the KPI to a KPI goal; and calculating the agent performance index as a combination of the normalized performance scores;

calculate a correlation between the agent engagement indices and the agent performance indices to obtain the gamification effectiveness, wherein the gamification effectiveness indicates whether corresponding gamification challenges are effective enough to improve the performance of the agent; and provide a notification regarding the gamification challenge to a supervisor, the notification including an indication of whether the engagement indices increase or decrease over time.

11. The system of claim 10, wherein the processor is configured to calculate the agent engagement index based on a ratio of the measured agent engagement with engagement of other agents.

12. The system of claim 10, wherein the engagement parameters comprise at least one of a view index, a time index and an activity index.

13. The system of claim 10, wherein the processor is configured to calculate the agent performance index based on a ratio of the measured agent performance to a performance goal.

14. The system of claim 10, wherein the KPIs comprise at least one of average handle time (AHT), cross talk time (CTT), first call resolution (FCR), and non-speech time (NST).

15. The system of claim 10, wherein the gamification challenge comprises a plurality of levels, each comprising one or more objectives, defined on the performance of the agent in relation to one or more key performance indicator (KPI), and a plurality of rewards, each associated with completion of a level, wherein the processor is configured to provide the gamification challenge by:

providing the one or more objectives of a first level to the agent; and providing the reward associated with completion of the first level and the one or more objectives of a second level once the one or more objectives of the first level are achieved by the agent.

16. The system of claim 15, wherein the processor is configured to:

if the gamification effectiveness is below a first threshold, and the agent engagement indices increase over time, perform at least one of: increasing at least one of the rewards or decreasing at least one of the qualitative goals; and if the gamification effectiveness is above a second threshold, and the agent engagement indices decrease over time, perform at least one of: changing the location of the gamification challenge on a display or providing notifications regarding the gamification challenge to the agent.

17. The method of claim 8, comprising, if the gamification effectiveness is above the second threshold, changing, by the processor, the presentation or appearance of the gamification challenge on the display.

18. The system of claim 16, wherein the processor is to change the presentation or appearance of the gamification challenge on the display if the gamification effectiveness is above the second threshold.

\* \* \* \* \*